United States Patent
McMaster et al.

(10) Patent No.: US 9,227,376 B2
(45) Date of Patent: Jan. 5, 2016

(54) THERMOPLASTIC ARTICLE FOR MOUNTING TO A SUPPORT STRUCTURE

(71) Applicant: BASF SE, Ludwigshafen (DE)

(72) Inventors: William J. McMaster, Berkeley Heights, NJ (US); Randy E. Fleck, Nazareth, PA (US); Stephen P. Serna, Hopatcong, NJ (US); Edward C. Caughey, Kernersville, NC (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/295,877

(22) Filed: Jun. 4, 2014

(65) Prior Publication Data

US 2014/0363612 A1    Dec. 11, 2014

Related U.S. Application Data

(60) Provisional application No. 61/831,955, filed on Jun. 6, 2013.

(51) Int. Cl.
    *B32B 3/06*    (2006.01)
(52) U.S. Cl.
    CPC ........... *B32B 3/06* (2013.01); *Y10T 428/24008* (2015.01)
(58) Field of Classification Search
    CPC .............. B25G 3/00; B25G 3/02; B25G 3/30; F16B 37/005; E05B 1/0015
    USPC ............ 428/99, 120, 188; 16/110.1, 412, 436
    See application file for complete search history.

(56) References Cited

U.S. PATENT DOCUMENTS

| 2,175,632 | A | 10/1939 | Maga |
| 3,995,349 | A * | 12/1976 | Roberts et al. ................... 16/412 |
| 6,096,256 | A | 8/2000 | Aretz |
| 6,473,939 | B1 | 11/2002 | Stegmaier |
| 7,070,725 | B2 | 7/2006 | Mathew et al. |
| 8,506,027 | B2 | 8/2013 | Klaus et al. |

(Continued)

FOREIGN PATENT DOCUMENTS

| DE | 9115292 U1 | 2/1992 |
| DE | 10119013 A1 | 10/2002 |

(Continued)

OTHER PUBLICATIONS

English language translation for DE 9115292 extracted from espacenet.com database on Feb. 5, 2014, 23 pages.

(Continued)

*Primary Examiner* — Alexander Thomas
(74) *Attorney, Agent, or Firm* — Howard & Howard Attorneys PLLC

(57) ABSTRACT

A thermoplastic article can be mounted to a support structure by a fastener. The article includes a molded body having a length. The molded body also has an attachment surface configured to face the support structure and a show surface opposite the attachment surface. The molded body defines an interior channel separating the attachment surface and the show surface. The article also includes a attachment boss coupled to and extending from the attachment surface for receiving the fastener to mount the article to the support structure. The attachment boss extends through the attachment surface and into the interior channel of the molded body for reinforcing the attachment boss at the attachment surface.

19 Claims, 5 Drawing Sheets

(56) References Cited

U.S. PATENT DOCUMENTS

| | | |
|---|---|---|
| 2010/0005631 A1 | 1/2010 | Drach et al. |
| 2012/0031389 A1 | 2/2012 | McMaster et al. |
| 2013/0129289 A1 | 5/2013 | Roland |

FOREIGN PATENT DOCUMENTS

| | | |
|---|---|---|
| GB | 2406823 A | 4/2005 |
| JP | S57201638 A | 12/1982 |

OTHER PUBLICATIONS

English language abstract and translation for DE 10119013 extracted from espacenet.com database on Feb. 5, 2014, 13 pages.

English language abstract for JP S57201638 extracted from espacenet.com database on Feb. 5, 2014, 5 pages.

GLS Total TPE Solutions North American Headquarters; "Overmolding Guide", Dec. 31, 2004, www.glstpes.com/pdf/literature/Overmold%20Design%20Guide.pdf.

International Search Report for Application No. PCT/US2013/052243 dated Oct. 16, 2013, 4 pages.

* cited by examiner

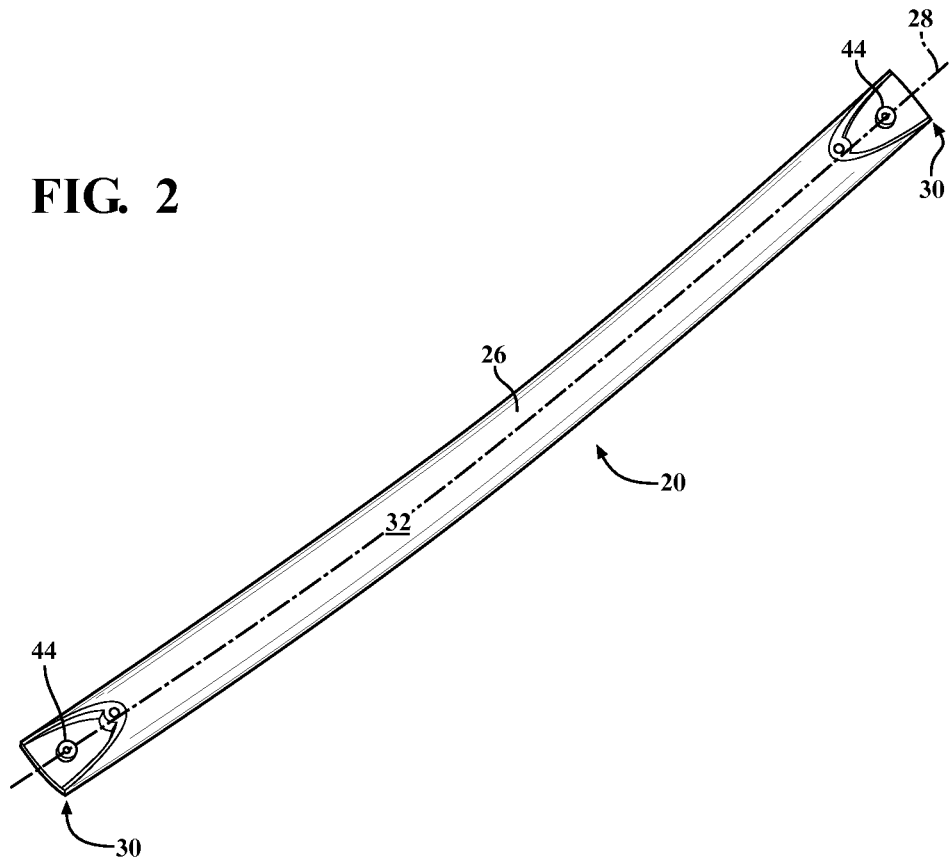
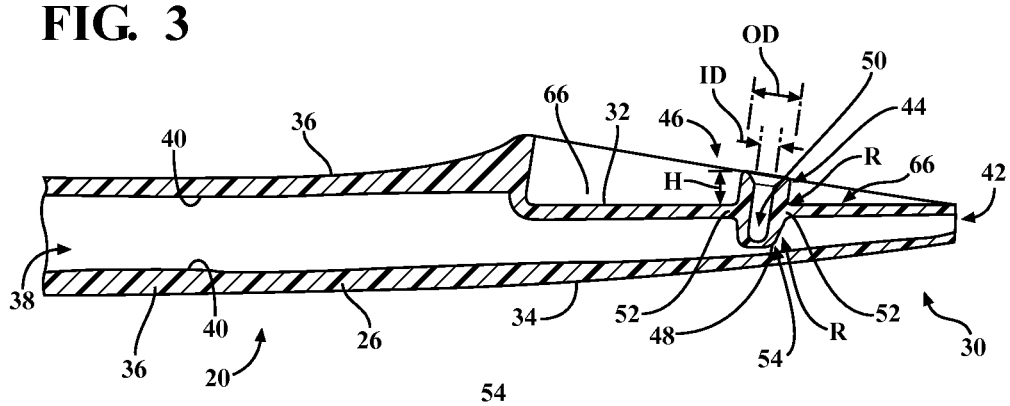

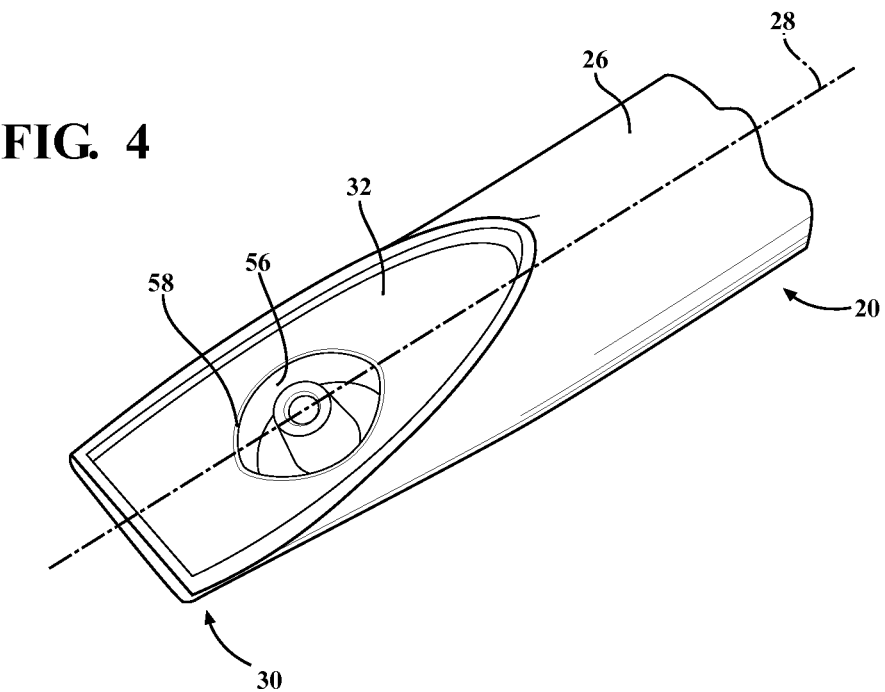
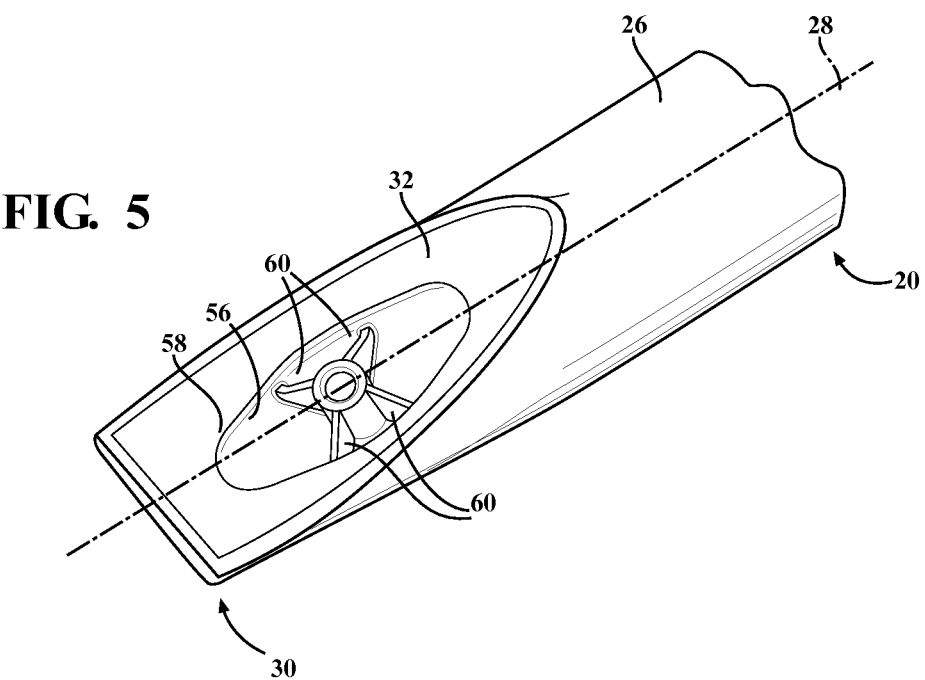

THERMOPLASTIC ARTICLE FOR MOUNTING TO A SUPPORT STRUCTURE

CROSS-REFERENCE TO RELATED APPLICATIONS

This application claims priority to and all the advantages of U.S. Provisional Application No. 61/831,955, filed on Jun. 6, 2013, the content of which is incorporated herein by reference.

BACKGROUND OF THE INVENTION

1. Field of the Invention

The present invention relates to an article for mounting to a support structure, more particularly to an article having a attachment boss for receiving a fastener to mount the article to the support structure.

2. Description of Related Art

Articles for attaching to a support structure are known, especially in the appliance handle industry. Typically, when the article is a handle for an appliance, such as a refrigerator or stove, the article is made from thermoplastic materials to provide a lightweight and cost effective article. The article typically includes at least two attachment bosses for receiving a fastener to attach the article to the support structure. Therefore, the attachment bosses must be strong enough to withstand forces acting on the article while attached to the support structure. Logic would suggest to simply increase a size of the attachment bosses to increase strength. However, increasing the size of the attachment bosses results in the formation of sink marks in a show surface of the article. Sink marks are indentations within the show surface and are undesirable because of the negative affect on the aesthetics of the article. It is believed that sink marks occur in an area of increased thickness because the relatively large mass of thermoplastic material located in the area cools at a relatively slower rate as compared to the thinner portions of the thermoplastic structure.

Efforts to overcome sink marks in thermoplastic articles have been disclosed in the prior art. For example, channels have been made within the thermoplastic article between the attachment bosses. Said differently, the interior of a portion of the thermoplastic article is hollow. The hollow interior reduces the thickness variation and is effective in eliminating sink marks. However, the hollow interior also has the undesirable consequence of weakening the article at the attachment bosses at the connection point with the thermoplastic article. The weakening of the attachment boss limits the environments which the thermoplastic article may be used for structural reasons. Said differently, a strong attachment boss is required in environments in which the thermoplastic article will be acted upon by an outside force, for example, as a handle for an appliance, such as a refrigerator or oven. Therefore, there remains an opportunity to develop an improved thermoplastic article having a show surface free of sink marks while maintaining a strength of a attachment boss.

SUMMARY OF THE INVENTION AND ADVANTAGES

A thermoplastic article can be mounted to a support structure by a fastener. The article includes a molded body having a length. The molded body also has an attachment surface configured to face the support structure and a show surface opposite the attachment surface. The molded body defines an interior channel separating the attachment surface and the show surface. The article also includes a attachment boss coupled to and extending from the attachment surface for receiving the fastener to mount the article to the support structure. The attachment boss extends through the attachment surface and into the interior channel of the molded body for reinforcing the attachment boss at the attachment surface. Reinforcing the attachment boss at the attachment surface increases a resistance to moment forces acting on the attachment boss caused by the fastener within the attachment element when forces act on the article attached to the support structure.

BRIEF DESCRIPTION OF THE DRAWINGS

Other advantages of the present invention will be readily appreciated, as the same becomes better understood by reference to the following detailed description, when considered in connection with the accompanying drawings wherein:

FIG. 2 is a perspective view of the article;

FIG. 3 is a cross-sectional view of the article having an attachment boss and an interior channel;

FIG. 4 is a perspective view of a portion of the article showing an attachment surface defining a recess with the attachment boss disposed within the recess;

FIG. 5 is a perspective view of a portion of the article showing a recess gusset interconnecting the attachment boss and a recess wall of the recess;

DETAILED DESCRIPTION OF THE INVENTION

Figure 1:
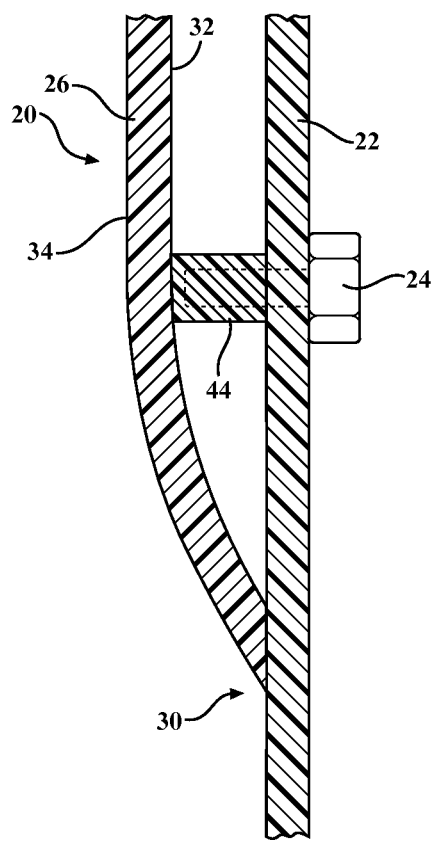
FIG. 1 is a cross-sectional view of a thermoplastic article mounted to a support structure by a fastener.

Referring to the Figures, wherein like numerals indicate like or corresponding parts throughout the several views, a thermoplastic article 20 for mounting to a support structure 22 by a fastener 24 is shown in FIG. 1. The support structure 22 can be any structure having a surface of any desired configuration that requires the thermoplastic article 20 to be attached there to. Examples of the support structure 22 include but are not limited to appliances, automobiles, and electronic devices. Examples of the thermoplastic article 20 include but are not limited to handles, trim pieces, kick plates, spoilers for automobiles, and face plates for consumer electronic devices.

With reference to FIGS. 1 and 2, the thermoplastic article 20 comprises a molded body 26 extending along a body axis 28 (shown in FIG. 2) between two ends 30. Generally, the molded body 26 has an attachment surface 32 which is spaced from the support structure 22. More specifically, the attachment surface 32 of the molded body 26 is configured to be disposed adjacent the support structure 22 such that the attachment surface 32 faces the support structure 22. The molded body 26 also includes a show surface 34 opposite the attachment surface 32.

With reference to FIG. 3, the molded body 26 has at least one wall 36 which presents the attachment surface 32 and the show surface 34. Generally, the show surface 34 is the surface presented and visible to an observer once the thermoplastic article 20 is mounted to the support structure 22. Said differently, the show surface 34 is an aesthetic side of the molded body 26 and typically faces away from the support structure 22 when the thermoplastic article 20 is mounted to the support structure 22. Although not required, the attachment surface 32 is generally shielded from view by the show surface 34 when the thermoplastic article 20 is attached to the support structure 22.

It is to be appreciated that the molded body 26 may extend linearly along the body axis 28, as shown in FIG. 2. Alternatively, the molded body 26 may have a curvilinear configuration along the body axis 28. Said differently, the molded body 26 may be curved. Additionally, a thickness of the molded body 26 may vary along the body axis 28. For example, the thickness of the molded body 26 may be increased in locations where the molded body 26 contacts the support structure 22. In such an embodiment, the attachment surface 32 may contact the support structure 22 in locations where the thickness has been increased and also be spaced from the support structure 22 in locations where the thickness of the molded body 26 is not increased.

The molded body 26 defines an interior channel 38 separating the attachment surface 32 and the show surface 34. More specifically, the wall 36 of the molded body 26 defines the interior channel 38. Even more specifically, the wall 36 of the molded body 26 includes an interior surface 40 and the interior surface 40 of the molded body 26 defines the interior channel 38. The interior channel 38 separates the attachment surface 32 and the show surface 34 of the molded body 26. Typically, the interior channel 38 is formed in the molded body 26 during formation of the molded body 26. For example, the molded body 26 may define an injection port 42 for introducing a substance, such as a fluid or gas, into the molded body 26 to form the interior channel 38. More specifically, the interior channel 38 is formed in the molded body 26 by injecting the substance into the molded body 26 as the molded body 26 is being formed.

The molded body 26 typically comprises a thermoplastic material. The thermoplastic material is typically selected from the group of polyester, polyamide, polyethylene terephthalate, polyvinyl butyral, and combinations thereof. It is to be appreciated that other thermoplastic materials include, but not limited, to acrylonitrile, butadiene styrene, polymethyl methacrylate, cellulose acetate, cyclic olefin copolymers, ethylene vinyl acetate, ethylene vinyl alcohol, fluoropolymers, polyoxymethylene, polyacrylates, polyacrylonitrile, polyaryletherketone, polyamide-imide, polybutadiene, polybutylene terephthalate, polycaprolactone, polycyclohexylene dimethylene, polyhydroxyalkanoates, polyketone, polyetheretherketone, polyetherimide, polycarbonate, polyethylene, polyimide, polylactic acid, polymethylpentene, polyphenylene sulfide, polyphenylene oxide, polyphthalamide, polystyrene, polysulfone, polytrimethylene terephthalate, polyurethane, polyvinyl acetate, polyetherketoneketone, chlorinated polyethylene, polylactic acid, polyvinyl chloride, polyvinylidene chloride, and styrene-acrylonitrile. Examples of suitable thermoplastic materials for the thermoplastic article 20 are commercially sold under the tradenames Petra, Ultradur, Ultramid, Ultraform, and Ultrason by BASF Corporation.

As described above, the interior channel 38 is formed in the molded body 26. Typically, the interior channel 38 is formed in the molded body 26 before the thermoplastic material is allowed to solidify. Depending on the processes, either a fluid or gas is injected into the molded body 26 to displace a portion of the thermoplastic material thereby creating the interior channel 38. It is to be appreciated that the process for forming the interior channel 38 may be referred to as gas assisted, water assisted, or liquid CO2 assisted molding. Formation of the interior channel 38 reduces a weight of the thermoplastic article 20. Additionally, the interior channel 38 of the molded body 26 reduces a thickness of the wall 36 of the molded body 26. It is to be appreciated that the thickness of the wall 36 may be reduced by a different amount in different locations. For example, the wall 36 presenting the show surface 34 may have a different thickness relative to the thickness of the wall 36 presenting the attachment surface 32. For example, the wall 36 of the molded body 26 which presents the attachment surface 32 typically has a thickness of from about 1.0 to about 4.0 millimeters.

With reference to FIGS. 1-3, the thermoplastic article 20 includes an attachment boss 44 coupled to and extending from the attachment surface 32 for receiving the fastener 24 to mount the thermoplastic article 20 to the support structure 22. As shown in FIG. 3, when present, the injection port 42 is typically spaced from the attachment boss 44. However, it is to be appreciated that other portions of the article 20 may define the injection port 42, such as the attachment boss 44. It is also to be appreciated that the fluid or gas may be injected directly into the injection port 42 or, alternatively, the fluid or gas may be injected through a runner which is disposed in the injection port 42.

With reference to FIG. 3, generally, the attachment boss 44 extends from the attachment surface 32 and terminates at an external end 46. A height H of the attachment boss 44 is defined between the attachment surface 32 and the external end 46 of the attachment boss 44. The external end 46 is spaced from the attachment surface 32 and is configured to be positioned adjacent the support structure 22 when the thermoplastic article 20 is coupled to the support structure 22. The attachment boss 44 also includes an internal end 48 opposite the external end 46. The internal end 48 is disposed within the molded body 26. More specifically, the internal end 48 is disposed within the interior channel 38 of the molded body 26. Said differently, the attachment boss 44 terminates at the internal end 48 such that the internal end 48 is disposed within the interior channel 38 with the internal end 48 of the attachment boss 44 also defining the interior channel 38.

It is to be appreciated that the attachment boss 44 may extend perpendicular to the attachment surface 32 or at an angle relative to the attachment surface 32. Generally, the attachment boss 44 has a cylindrical configuration. However, it is to be appreciated that other geometries, such as a cubic configuration, are also contemplated and maybe advantageous depending on the nature of the support structure 22 or desired physical appearance. Said differently, a designer may prefer the ascetic appearance of the attachment boss 44 having a cubic configuration to that of the attachment boss 44 having the cylindrical configuration.

It is to be appreciated that the attachment boss 44 and the molded body 26 may be formed as one inseparable unit. Alternatively, the attachment boss 44 may be formed separately from the molded body 26 and subsequently attached to the molded body 26. For example, the attachment boss 44 may be attached to the molded body 26 by an adhesive, a melt bond, a mechanical attachment, a fastener 24, or other suitable means for attaching the attachment boss 44 to the molded body 26.

The attachment boss 44 may have a hollow interior 50 for receiving the fastener 24 to mount the thermoplastic article 20 to the support structure 22. For example, the hollow interior 50 defines an inner diameter ID of the attachment boss 44 with the fastener 24 slightly larger than the inner diameter ID of the attachment boss 44 such that threads on the fastener 24 engage the hollow interior 50 of the attachment boss 44. Alternatively, the attachment boss 44 may be solid such that the attachment boss 44 does not define the hollow interior 50. When the attachment boss 44 is solid, the fastener 24 may be a self tapping type of fastener 24, such that the self tapping fastener 24 bores into the attachment boss 44 with the resulting bore presenting the hollow interior 50 of the attachment boss 44.

The hollow interior 50 of the attachment boss 44 may extend from the external end 46 of the attachment boss 44 to the internal end 48 within the interior channel 38. Said differently the hollow interior 50 extends through the entire attachment boss 44. As such, the fastener 24 that is used to coupled the thermoplastic article 20 to the support structure 22 extends beyond the attachment surface 32 and into the interior channel 38. In the alternative, the hollow interior 50 of the attachment boss 44 may extend from the external end 46 of the attachment boss 44 and terminate at the attachment surface 32 of the molded body 26.

Typically, once the thermoplastic article 20 is attached to the support structure 22, the thermoplastic article 20 must be able to withstand a normal force acting upon the thermoplastic article 20. For example, when the thermoplastic article 20 is a handle for an appliance, such as a refrigerator or oven, the thermoplastic article 20 must be capable of withstanding normal forces associated with opening a door of the appliance without failure. Generally, the thermoplastic article 20 is designed to withstand the normal forces plus an additional factor of safety to ensure the thermoplastic article 20 does not fail during normal use.

As introduced above, the attachment boss 44 extends through the attachment surface 32 and into the interior channel 38 of the molded body 26. The attachment boss 44 extends into the interior channel 38 for reinforcing the attachment boss 44 at the attachment surface 32. Said differently, extending the attachment boss 44 through the attachment surface 32 increases a surface area of the attachment boss 44 the normal force is applied to when the normal force acts on the thermoplastic article 20. For example, the normal force acting on the thermoplastic article 20 can generate a moment force at the attachment point (the attachment surface 32) between the attachment boss 44 and the molded body 26. If the attachment boss 44 terminated that the attachment surface 32, the moment force would only be applied to the wall 36 of the attachment boss 44 on one side of the attachment surface 32. However, extending the attachment boss 44 thought the attachment surface 32 results in the moment force being applied to the wall 36 of the attachment boss 44 on both sides of the attachment surface 32 essentially doubling the surface area of the attachment boss 44 the moment force acts on relative to the example where the attachment boss 44 terminates at the attachment surface 32. Therefore, the attachment boss 44 that extends through the attachment surface 32 can withstand a higher normal force as compared to the example where the attachment boss 44 terminated at the attachment surface 32.

The benefit of gaining additional strength by extending the attachment boss 44 through the attachment surface 32 is further benefited by the molded body 26 having the hollow interior 50. As described above, the internal end 48 of the attachment boss 44 is within the interior channel 38. As such, the attachment boss 44 is free to pivot within the interior channel 38 as the moment force acts on the attachment boss 44. The pivoting of the attachment boss 44 allows for additional dissipation of the moment force acting on the attachment boss 44. Additionally, extending the attachment boss 44 through the attachment surface 32 allows the fastener 24 to also extend beyond the attachment surface 32. Allowing the fastener 24 to extend beyond the attachment surface 32 controls the pivoting of the attachment boss 44 as the normal force acts on the attachment boss 44. Additionally, extending the fastener 24 beyond the attachment surface 32 allows some of the normal force acting on the thermoplastic article 20 to be directly transferred into the molded body 26 thus reducing the resulting moment force generated by the normal force acting on the thermoplastic article 20.

As described above, the attachment boss 44 typically has a cylindrical configuration. As such, the attachment boss 44 defines an outer diameter OD, which is the cross-sectional diameter of the attachment boss 44. Typically, the outer diameter OD of the attachment boss 44 is of from about 3 to 18, more typically of from about 6, to about 12, and even more typically of from about 6 to about 8 millimeters.

Increasing the outer diameter OD of the attachment boss 44 increases a cross-sectional area of the attachment boss 44 at the attachment surface 32. Increasing the cross-sectional area of the attachment boss 44 increases the area to dissipate the normal force acting on the thermoplastic article 20 thereby allowing the thermoplastic article 20 to experience higher normal forces without failure.

Typically, there is a desire to decrease the outer diameter OD of the attachment boss 44 because of the potential of sink marks to form on the show surface 34. For example, the outer diameter OD of the attachment boss 44 is typically held to be below 2 to 2.5 times the inner diameter ID of the attachment boss 44. It is believed that increasing the cross-sectional area of the attachment boss 44 contributes to the formation of sink marks because of the different cooling rates of the thermoplastic material in areas of different thicknesses. However, because the interior channel 38 separates the attachment surface 32 and the show surface 34 at the attachment boss 44, the outer diameter OD of the attachment boss 44 is not as critical. Said differently, the separation of the attachment surface 32 and the show surface 34 of the molded body 26 by the interior channel 38 prevents the formation of sink marks on the show surface 34 caused by the increased cross-sectional area of the attachment boss 44.

The attachment boss 44 may also include an exterior fillet 52 interconnecting the attachment boss 44 and the attachment surface 32. Likewise, the attachment boss 44 may further include an interconnecting the attachment boss 44 within the interior channel 38 and the interior surface 40 of the molded body 26. When present, the exterior fillet 52 and/or the interior fillet 54 increases the cross-sectional area of the attachment boss 44 at the attachment surface 32 to prevent the attachment boss 44 from failing at the attachment surface 32. As described above, increasing the cross-sectional area of the attachment boss 44 increases the area to dissipate the normal force acting on the thermoplastic article 20 thereby allowing the thermoplastic article 20 to experience higher normal forces without failure. For example, when the thermoplastic article 20 is the handle of the appliance, such as an oven, forces are applied to the handle to open a door of the oven. The forces are transferred from the thermoplastic article 20 to the oven door through the attachment boss 44. Therefore, the attachment boss 44 must be able to withstand a predetermined maximum normal force that is anticipated to be applied to the thermoplastic article 20 without failing. Increases the cross-sectional area of the attachment boss 44 at the attachment surface 32 dissipates the normal force acting on the thermoplastic article 20 over a larger area, which allows the attachment boss 44 to withstand greater forces without failure as compared to attachment boss 44es which have a smaller cross-sectional area.

The exterior fillet 52 and the interior fillet 54 each have a radius R. Typically, the radius R of the exterior fillet 52 and the interior fillet 54 is of from about 0.5 to about 0.75 millimeters. It is to be appreciated that the radius R of interior fillet 54 and the exterior fillet 52 may be the same or different from each other.

Similar to the outer diameter OD of the attachment boss 44, if the exterior fillet 52 is present, there is typically a desire to decrease the radius R of the exterior fillet 52 to decrease the cross-sectional area of the attachment boss 44 because of the potential of sink marks to form on the show surface 34. For example, the radius R of the exterior fillet 52 is typically held to be below 0.5 millimeters. Again, it is believed that increasing the cross-sectional area of the attachment boss 44 contributes to the formation of sink marks because of the different cooling rates of the thermoplastic material in areas of different thicknesses. However, because the interior channel 38 separates the attachment surface 32 and the show surface 34, the radius R of the exterior fillet 52 of the attachment boss 44 is not as critical. Said differently, the separation of the attachment surface 32 and the show surface 34 of the molded body 26 by the interior channel 38 prevents the formation of sink marks on the show surface 34 caused by the increased cross-sectional area of the attachment boss 44.

With reference to FIG. 4, the thermoplastic article 20 may include a recess wall 56. The attachment surface 32 of the molded body 26 and the recess wall 56 may define a recess 58. When present, the attachment boss 44 is disposed within the recess 58 with the attachment boss 44 spaced from the recess wall 56. Disposing the attachment boss 44 within the recess 58 isolates the attachment boss 44 from the recess wall 56 to minimize the normal force transferred to the attachment boss 44. It is to be appreciated that the recess 58 may have any suitable cross-sectional configuration. For example, in one embodiment, the cross-sectional configuration of the recess 58 presents an ovular configuration.

With reference to FIG. 5, when the recess 58 is present, the attachment boss 44 may include at least one recess gusset 60 interconnecting the attachment boss 44 and the recess wall 56 within the recess 58. The recess gusset 60 reinforces the attachment boss 44 within the recess 58. Said differently, the recess gusset 60 prevents the attachment boss 44 from moving within the recess 58.

Figure 6:
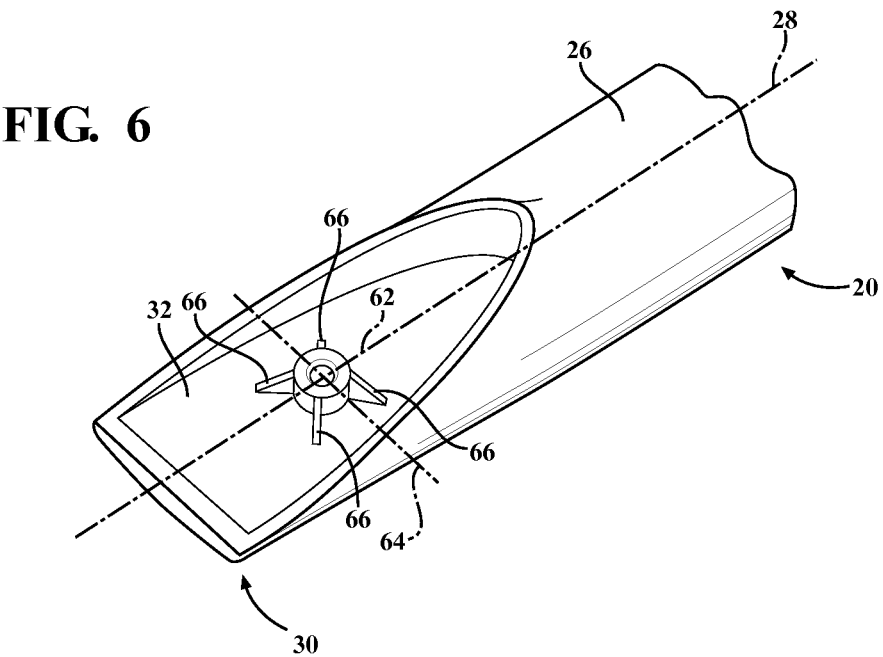
FIG. 6 is a perspective view of a portion of the article with the attachment boss having gussets interconnecting the attachment boss and the attachment surface.
Figure 9:
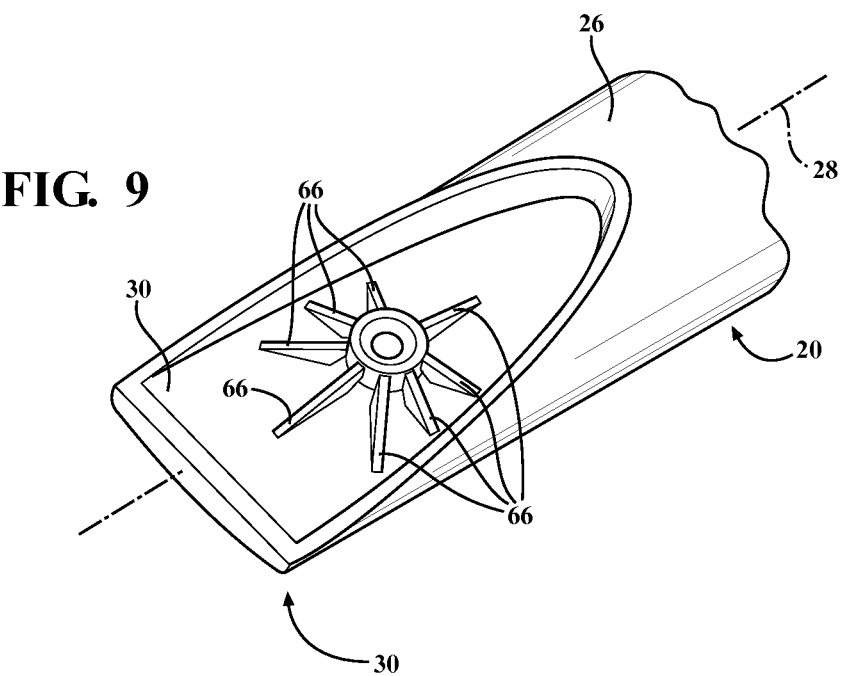
FIG. 9 is a perspective view of a portion of the article showing the attachment boss having at least eight gussets.

With reference to FIG. 6, generally, the attachment boss 44 includes a longitudinal axis 62 extending substantial parallel with the body axis 28 of the molded body 26. The longitudinal axis 62 bisects the attachment boss 44. The attachment boss 44 may also include a lateral axis 64 transverse to the longitudinal axis 62. The lateral axis 64 also bisects the attachment boss 44 such that the longitudinal axis 62 and the lateral axis 64 divides the attachment boss 44 into quadrants. In such an embodiment, the attachment boss 44 may include a plurality of gussets 66 extending from each quadrant of the attachment boss 44 and interconnecting the attachment boss 44 and the attachment surface 32. However, it is to be appreciated that the attachment boss 44 may have more than one gusset extending from each quadrant. For example, as shown in FIG. 9, the attachment boss 44 may have at least eight gussets 66 evenly spaced about the attachment boss 44.

The gussets 66 increase the cross-sectional area of the attachment boss 44 at the attachment surface 32. As described above, increasing the cross-sectional area of the attachment boss 44 at the attachment surface 32 increases the area to dissipate the normal force acting on the thermoplastic article 20 thereby allowing the thermoplastic article 20 to experience higher normal forces without failure.

Figure 7:
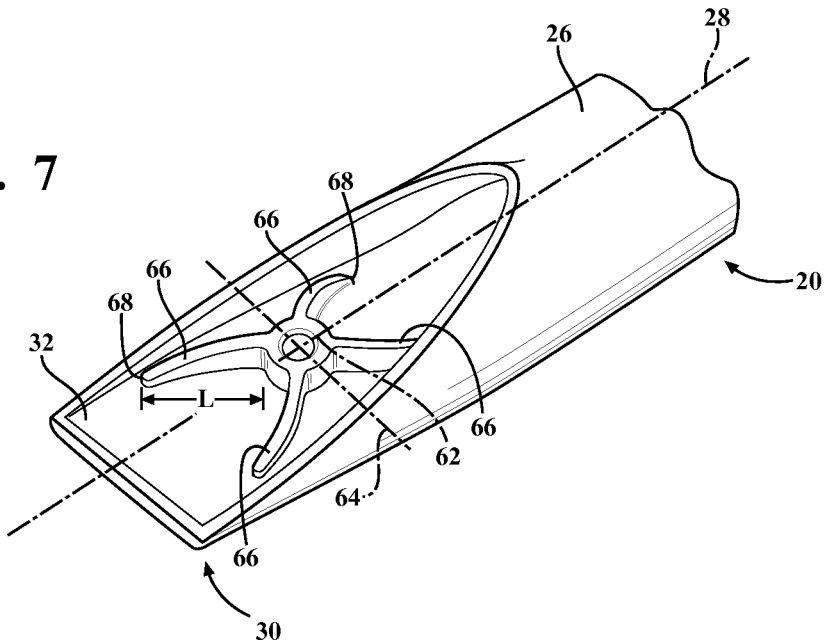
FIG. 7 is a perspective view of a portion of the article showing the gussets having a curvilinear profile along the attachment surface.

As shown in FIG. 7, the gussets 66 may have a curvilinear profile along the attachment surface 32 such that the gussets 66 curve toward the longitudinal axis 62 of the attachment boss 44 as the gussets 66 extend from the attachment boss 44. However, it is to be appreciated that the gussets 66 may have any profile along the attachment surface 32. The curvilinear profile of the gussets 66 along the attachment surface 32 allows for a length L of the gussets 66 to be longer in confined spaces and also provides increases stiffness.

As introduced above, the gussets 66 have the length L. More specifically, the gussets 66 extend from the attachment boss 44 and terminate at a gusset end 68. The length L of the gussets 66 is measured from the attachment boss 44 to the gusset end 68 along the attachment surface 32. In one embodiment, the length L of at least two of the gussets 66 is greater than the length L of at least one of the gussets 66. Said differently, two of the gussets 66 are longer than the remaining gussets 66. For example, in FIG. 7 the gussets 66 on the left side of the lateral axis 64 of the attachment boss 44 are longer than the gussets 66 on the right side of the lateral axis 64.

In one embodiment, the length L of the gussets 66 is greater than the height H of the attachment boss 44. For example, the height H of the attachment boss 44 is typically of from about 6.0 to about 12.0 millimeters. The length L of the gussets 66 is typically of from about 5.0 to about 30.0, more typically of from about 10.0 to about 20.0, and even more typically of from about 12.0 to about 18.0 millimeters.

Figure 8:
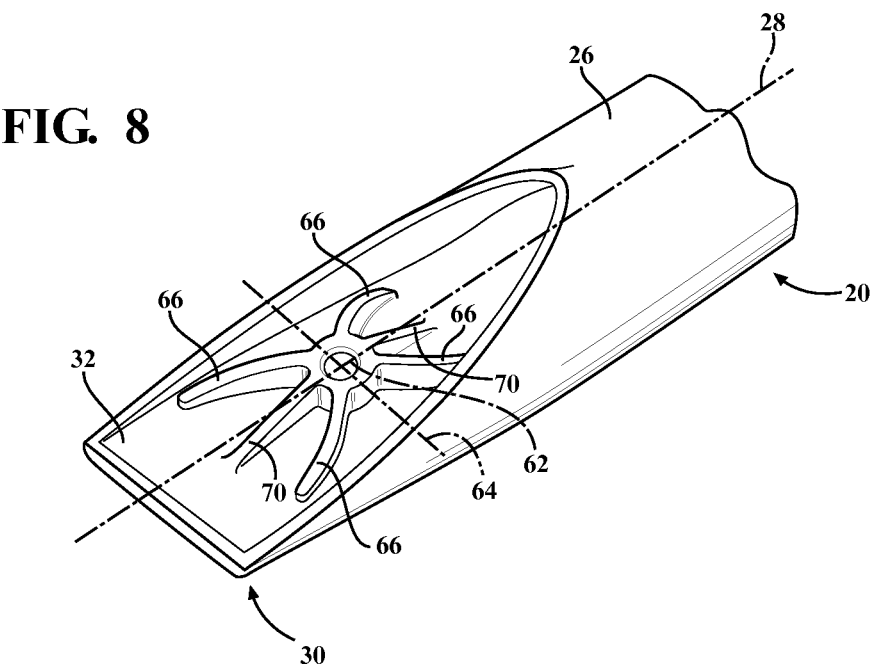
FIG. 8 is a perspective view of a portion of the article showing the attachment boss having axial gussets.

As shown in FIG. 8, the attachment boss 44 may include a pair of axial gussets 70 extending from the attachment boss 44 in opposite directions relative to each other along the longitudinal axis 62. The axial gussets 70 are spaced from the gussets 66. The axial gussets 70 increase the cross-sectional area of the attachment boss 44 and provide additional strength to the attachment boss 44.

Similar to the gussets 66, the axial gussets 70 have a length L defined between the gusset end 68 and the attachment boss 44. Typically, the length L of one of the axial gussets 70 is greater than the length L of another one of the axial gussets 70. For example, as shown in FIG. 8, the axial gusset 70 on the left side of the lateral axis 64 of the attachment boss 44 is longer than the axial gusset 70 on the right side of the lateral axis 64. As introduced above, the molded body 26 has a pair of ends 30. The length L of the gussets 66 and the axial gusset 70 proximate one of the ends 30 of the molded body 26 is greater than the length L of the gussets 66 and the axial gusset 70 distal the ends of the molded body 26.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An article for mounting to a support structure by a fastener, said article comprising:
   a molded body extending along a body axis, with said molded body having an attachment surface and a show surface opposite said attachment surface and with said molded body defining an interior channel separating said attachment surface and said show surface;

an attachment boss coupled to and extending from said attachment surface for receiving the fastener to mount said article to the support structure;

wherein said attachment boss extends through said attachment surface and into said interior channel of said molded body for reinforcing said attachment boss at said attachment surface.

2. An article as set forth in claim 1 wherein said attachment boss includes a longitudinal axis extending substantial parallel with said body axis of said molded body and bisecting said attachment boss and said attachment boss includes a lateral axis transverse to said longitudinal axis and bisecting said attachment boss such that said longitudinal axis and said lateral axis divides said attachment boss into quadrants with said attachment boss including gussets extending from each quadrant of said attachment boss and interconnecting said attachment boss and said attachment surface.

3. An article as set forth in claim 2 wherein said gussets have a curvilinear profile along said attachment surface such that said gussets curve toward said longitudinal axis of said attachment boss as said gussets extend from said attachment boss.

4. An article as set forth in claim 3 wherein each of said gussets have a length and said length of at least two of said gussets is greater than said length of at least one of said gussets.

5. An article as set forth in claim 4 wherein said attachment boss extends from said attachment surface and terminates at an external end with a height of said attachment boss defined between said attachment surface and said external end of said attachment boss and with said length of said gussets greater than said height of said attachment boss.

6. An article as set forth in claim 4 wherein said attachment boss including a pair of axial gussets extending from said attachment boss in opposite directions relative to each other along said longitudinal axis and spaced from said gussets.

7. An article as set forth in claim 6 wherein said axial gussets have a length and said length of one of said axial gussets is greater than said length of another one of said axial gussets.

8. An article as set forth in claim 7 wherein said molded body has an end and said length of said gussets and said axial gusset proximate said end of said molded body is greater than said length of said gussets and said axial gusset distal said end of said molded body.

9. An article as set forth in claim 1 wherein said attachment boss further includes an exterior fillet interconnecting said attachment boss and said attachment surface for increasing a cross-sectional area of said attachment boss at said attachment surface to prevent said attachment boss from failing at said attachment surface.

10. An article as set forth in claim 9 wherein said exterior fillet has a radius of from about 0.5 to about 0.75 millimeters.

11. An article as set forth in claim 9 wherein said molded body includes an interior surface defining said interior channel and said attachment boss further includes an interior fillet interconnecting said attachment boss within said interior channel and said interior surface of said molded body for increasing a cross-sectional area of said attachment boss at said interior surface to prevent said attachment boss from failing at said interior surface.

12. An article as set forth in claim 1 wherein said molded body includes a recess wall and said attachment surface of said molded body and said recess wall defines a recess with said attachment boss disposed within said recess and with said attachment boss spaced from said recess wall.

13. An article as set forth in claim 12 wherein said attachment boss further includes at least one gusset interconnecting said fasting boss and said recess wall within said recess.

14. An article as set forth in claim 12 wherein said recesses presents an ovular configuration.

15. An article as set forth in claim 1 wherein said attachment boss further includes at least eight gussets interconnecting said attachment boss and said attachment surface with said gussets evenly spaced about said attachment boss.

16. An article as set forth in claim 1 wherein said molded body comprises a thermoplastic material selected from the group of polyester, nylon, polyethylene terephthalate, polyvinyl butyral, and combinations thereof.

17. An article as set forth in claim 1 wherein said attachment boss terminates at an internal end with said internal end of said attachment boss disposed within said interior channel such that said internal end of said attachment boss also defines said interior channel.

18. An article as set forth in claim 1 wherein said molded body defines an injection port for introducing a substance into said molded body to form said interior channel with said injection port spaced from said attachment boss.

19. An article as set forth in claim 1 wherein said article is a handle for appliances.

* * * * *